UNITED STATES PATENT OFFICE.

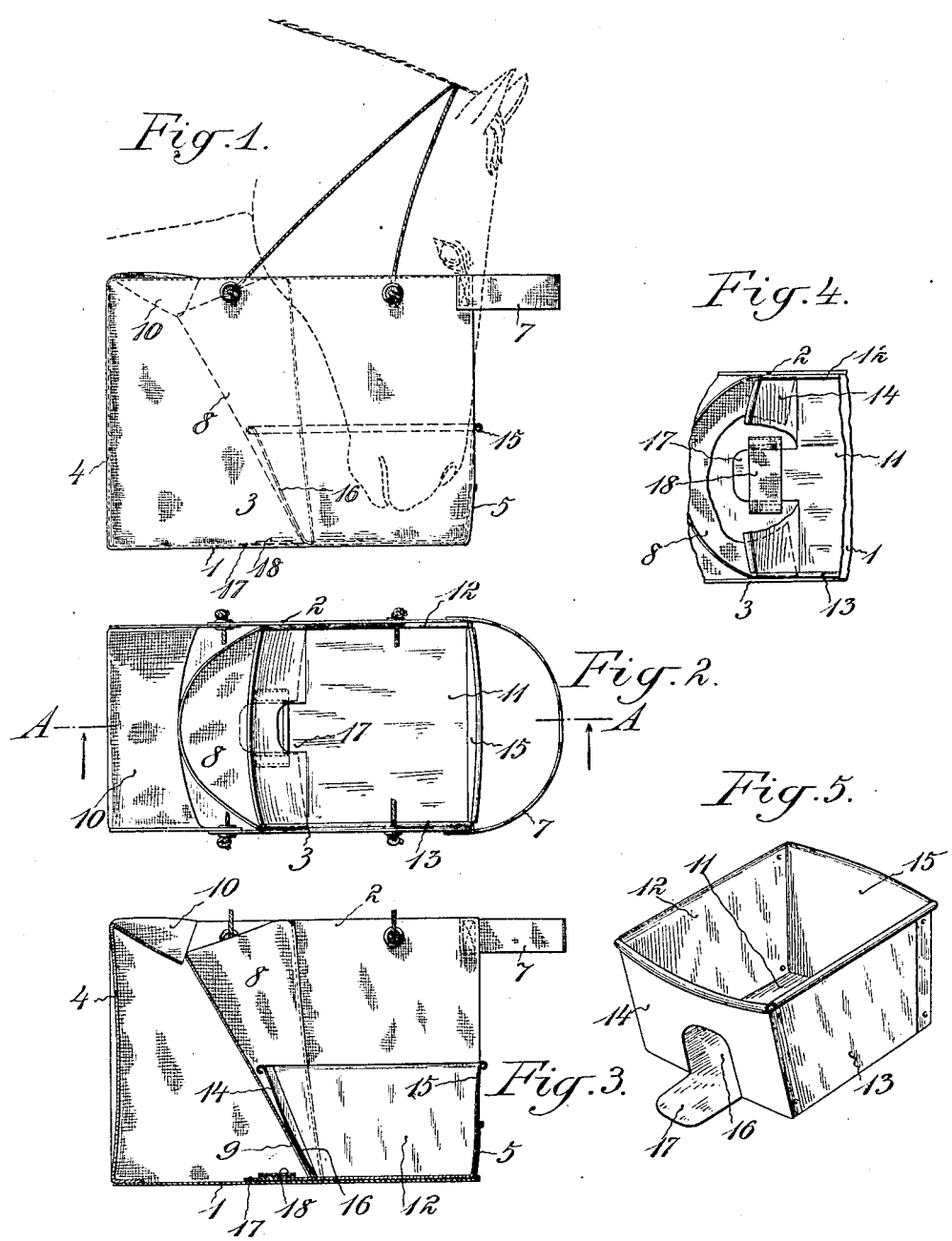

ANDREW GAUL, JR., OF RIDGEFIELD, NEW JERSEY.

FEED-BAG.

No. 906,702.  Specification of Letters Patent.  Patented Dec. 15, 1908.

Application filed March 28, 1908. Serial No. 423,804.

*To all whom it may concern:*

Be it known that I, ANDREW GAUL, Jr., a citizen of the United States, and resident of Ridgefield, in the county of Bergen and State of New Jersey, have invented a new and useful Improvement in Feed-Bags, of which the following is a specification.

My invention relates to an improvement in feed bags and has for its object to provide removable feed pans therefor so that the bag itself may be keep sweet and clean because of the fact that the removable pan will receive the slobber of the animal and can be removed and thoroughly cleansed as often as required.

A practical embodiment of my invention is represented in the accompanying drawings, in which—

Figure 1 represents in side elevation a magazine feed bag of improved design with my removable feed pan in position therein, the manner of suspending the bag from the horse's neck also being indicated, Fig. 2 is a top plan view of the bag, Fig. 3 is a section taken in the plane of the line A—A of Fig. 2, looking in the direction of the arrows, Fig. 4 is a detail plan view with certain of the parts broken away to more clearly indicate the strap for engaging the bottom extension of the pan, and Fig. 5 is a perspective view of the pan.

The feed bag in connection with which I have chosen to show my removable feed pan is made of some suitable flexible material such, for instance, as canvas.

The oblong bottom of the bag is denoted by 1 and its substantially vertical side and end walls by 2, 3, 4, and 5. The front wall 5 of the bag extends only a short distance upwardly from the bottom 1 thus leaving the front of the bag unobstructed except for the strap 7 which extends from the tops of the sides 2 and 3 at the front of the bag for preventing the sides from spreading too far apart at this point.

A transverse partition 8 divides the bag into a front feed compartment and a rear magazine compartment. This partition has a hole 9 therethrough at its bottom for permitting the feed within the magazine compartment to pass into the feed compartment. A partial cover 10 may be provided for preventing the feed from being shaken out of the magazine compartment.

A removable feed pan of some suitable rigid material such as metal, is provided for the feed compartment of the bag, which pan comprises a bottom 11 and uprising side and end walls 12, 13, 14, 15. The rear end wall 14 of the pan is provided with a hole 16 therethrough, which hole corresponds with the hole 9 in the partition 8 so that the feed from the magazine compartment of the feed bag will pass onto the bottom of the feed pan. This feed pan is provided with a bottom extension 17 which extends into the magazine compartment along the bottom thereof and beneath a strap 18. This extension 17 serves to further direct the feed from the magazine compartment into the feed pan and by its engagement with the strap 18 will hold the pan within the bag against unintentional removal.

In practice, the pans are made sufficiently deep so that the slobber from the animal's mouth will not come in contact with the bag itself but will be confined within the pan. Any time after the animal has been fed, the pan may be readily removed from the bag and thoroughly cleansed. The bag is thus kept sweet and clean.

What I claim is:—

1. A feed bag comprising a complete bottom and walls uprising therefrom and a removable feed pan located within the feed bag.

2. A feed bag having feed and magazine compartments and a removable feed pan for the feed compartment, said pan being in open communication with the magazine compartment.

3. A feed bag having a transverse partition dividing it into feed and magazine compartments and a removable feed pan for the feed compartment, said partition and feed pan having holes therethrough in alinement with each other for permitting the feed to run from the magazine compartment into the feed pan.

4. A feed bag having a transverse partition dividing it into feed and magazine compartments and a removable feed pan for the feed compartment, said partition and feed pan having holes therethrough in alinement with each other for permitting the feed to run from the magazine compartment into the feed pan, said feed pan having a bottom extension leading through the hole in the partition into the magazine compartment.

5. A feed bag having a transverse partition dividing it into feed and magazine compartments and a removable feed pan for the feed compartment, said partition and feed pan having holes therethrough in alinement with each other for permitting the feed to run from the magazine compartment into the feed pan, said feed pan having a bottom extension leading through the hole in the partition into the magazine compartment, and a strap on the bottom of the magazine compartment for engaging said bottom extension.

In testimony, that I claim the foregoing as my invention, I have signed my name in presence of two witnesses, this twenty-seventh day of March 1908.

ANDREW GAUL, Jr.

Witnesses:
F. GEORGE BARRY,
HENRY THIEME.